(12) United States Patent
Bajaria et al.

(10) Patent No.: US 12,041,054 B2
(45) Date of Patent: Jul. 16, 2024

(54) METHODS AND SYSTEMS FOR DETECTING INADVERTENT UNAUTHORIZED ACCOUNT ACCESS

(71) Applicant: Microsoft Technology Licensing, LLC, Redmond, WA (US)

(72) Inventors: Parag Bajaria, Cupertino, CA (US); Naveen Teja Jangalapalli, San Jose, CA (US); Maya Neelakandhan, Sunnyvale, CA (US); Venkata Adusumilli, Cupertino, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 368 days.

(21) Appl. No.: 17/492,226

(22) Filed: Oct. 1, 2021

(65) Prior Publication Data

US 2022/0109677 A1   Apr. 7, 2022

Related U.S. Application Data

(60) Provisional application No. 63/087,254, filed on Oct. 4, 2020.

(51) Int. Cl.
*H04L 9/40* (2022.01)
*G06F 16/901* (2019.01)
*G06F 21/60* (2013.01)

(52) U.S. Cl.
CPC ........ *H04L 63/102* (2013.01); *G06F 16/9027* (2019.01); *G06F 21/604* (2013.01); *H04L 63/20* (2013.01)

(58) Field of Classification Search
CPC ... H04L 63/102; G06F 16/9027; G06F 21/604
USPC .......................................................... 726/4
See application file for complete search history.

(56) References Cited

U.S. PATENT DOCUMENTS

| 10,250,612 B1* | 4/2019 | Raposa ................. H04L 63/108 |
| 10,965,686 B1* | 3/2021 | Agarwwal .......... H04L 63/1425 |
| 2015/0269390 A1* | 9/2015 | Schaefer ............... G06F 21/604 707/781 |

* cited by examiner

*Primary Examiner* — Michael S McNally
(74) *Attorney, Agent, or Firm* — Weaver IP L.L.C.

(57) ABSTRACT

Methods, systems, apparatuses, and computer-readable storage mediums described herein are configured to automatically detect inadvertent, unauthorized account access. For example, a user account may be analyzed to identify roles thereof that permit identities of other accounts to assume the roles of the user account. The analysis is performed for each identified account, including any accounts having roles that permit identities of further accounts to assume the roles of the identified accounts. Accordingly, a chain of roles may be determined that indicates how one account may have access to another account via one or more intervening role assignments. This circuitous path of account access may be represented and displayed to a user, e.g., via a tree structure. Upon identifying an unauthorized account, an appropriate action may be performed to adjust permissions.

20 Claims, 5 Drawing Sheets

METHODS AND SYSTEMS FOR DETECTING INADVERTENT UNAUTHORIZED ACCOUNT ACCESS

CROSS-REFERENCE TO RELATED APPLICATION(S)

This application claims priority to U.S. Provisional Patent Application No. 63/087,254 entitled "Detection of Inadvertent Permissions in AWS," and filed on Oct. 4, 2020, the entirety of which is incorporated by reference herein.

BACKGROUND

Cloud computing platforms, such as Amazon Web Services (AWS) from Amazon.com, Inc. of Seattle, WA, provide for two different main types of entities: users and roles. Such entities may be managed by a cloud-based identity and access management service, such as the Identity and Access Management (IAM) service published by Amazon.com, Inc. In certain cases, roles may permit cross-account access and are considered account "entry points". Often, the fact that identities, such as roles, can enter an account and perform actions is an unintended consequence of the way identities are managed across multiple accounts. This is a security risk.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to detect inadvertent, unauthorized account access. For example, a user account may be analyzed to identify roles thereof that permit identities of other accounts to assume the roles of the user account. The analysis is performed for each identified account, including any accounts having roles that permit identities of further accounts to assume the roles of the identified accounts. Accordingly, chain of roles may be determined that indicates how one account may have access to another account via one or intervening role assignments. This circuitous path of account access may be represented and displayed to a user, e.g., via a tree structure. Upon identifying an unauthorized account, an appropriate action may be performed to adjust permissions to prevent the unauthorized access.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
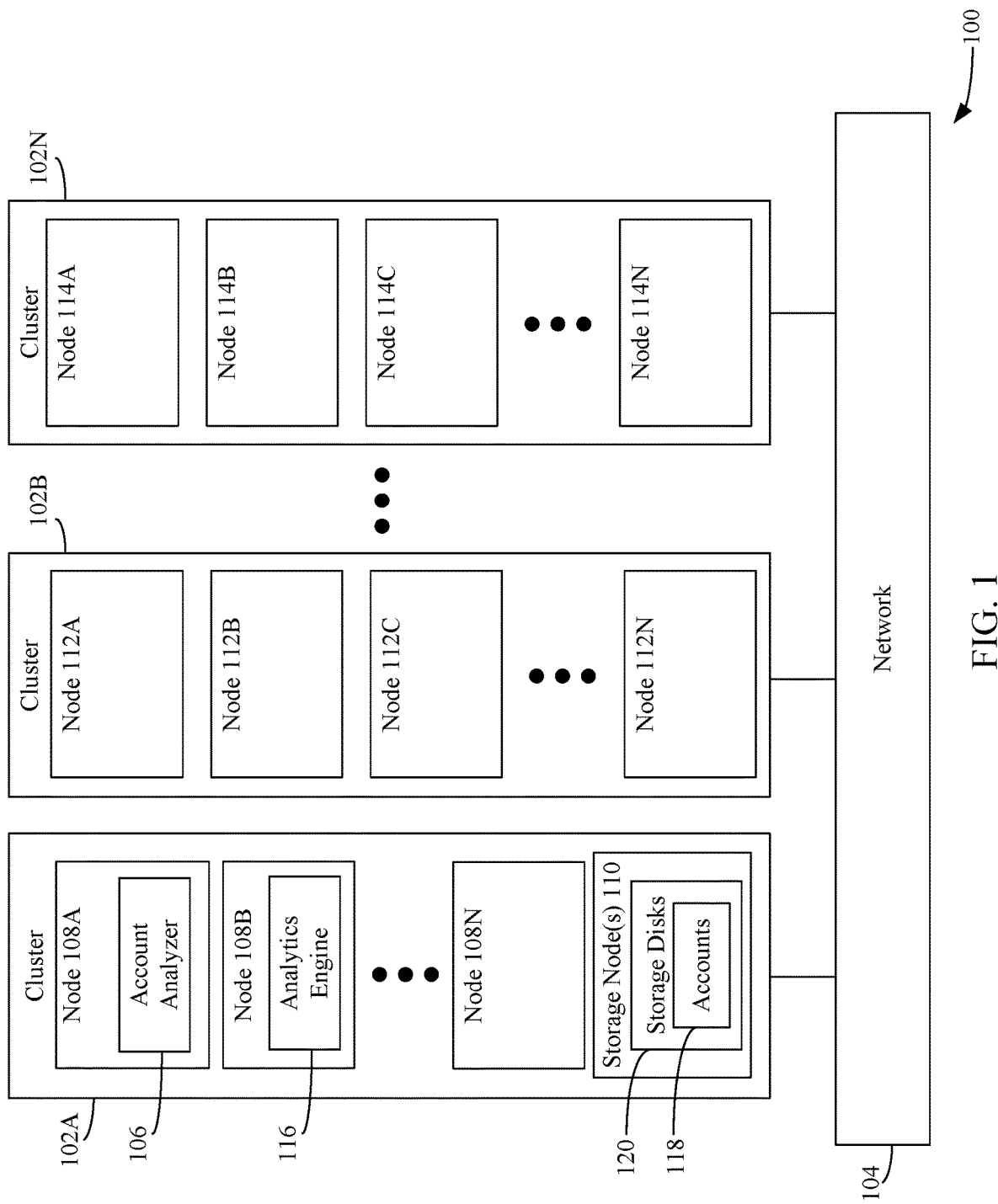
FIG. 1 depicts a block diagram of an example network-based computing system configured to detect unauthorized account access in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, terms such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

A user in a cloud computing platform may be defined as any person or service that interacts with a cloud computing platform. Using passwords or other authentication mechanisms, users can log into a console or portal to perform actions, or they can use access keys to invoke application programming interfaces (APIs) provided by the cloud computing platform. Users may be assigned permissions through a policy mechanism provided by the identity and access management service. The permissions are a collection of policies that apply to the user that ultimately determine the user's authorization (i.e., what the user is permitted to do within the cloud computing platform).

When an entity first creates a cloud computing platform account, it may initially be set up with a single sign-in identity (e.g., the "root user") that has complete access to all the account's cloud computing platform-based services and resources. When a user is created, it may be made a member of a group and receives either permissions assigned to all members of the group, permissions assigned specifically to that user, or both. A group administrator can add, change, or revoke permissions of a user or a group of users.

An entity within a cloud computing platform may also have one or more "roles", each of which is an identity along with its own sets of policies and permissions that specify what the identity can and cannot do in the cloud computing platform. Unlike a user, a role typically is not associated with such credentials as a password or access keys. A role is not usually tied to a specific user or set of users, but rather may be assigned to whichever user(s) need it either temporarily or permanently. This enables the account creator and administrator to have the flexibility to give different users permissions as needed, e.g., by associating them with the corresponding role, but without having to expose the users' credentials.

When a user authenticates with a cloud computing platform (such as AWS), the user might choose to "assume" a role (if a user policy allows it), at which time the "user" is the role. In such instances, the user may not simply get the permissions of the role; rather, the user actually exchanges its original identity for that of the role. The user can then do only exactly what the role is permitted to do; the user's original permissions are withdrawn for as long as the user is the role. All activity is logged as having been done by the role, not by the user. The user may at any time "log out" of the role and go back to its original identity, but may never be both at the same time.

Another important feature of roles is that they have two sets of policies: one set of policies that declare what the role can do, and another set of policies that declare who can assume the role in the first place. In AWS, this second set of policies is defined in a "assume role policy document" (ARPD) for each role. For a user (or another role) to be allowed to assume a given role, the first identity needs to both have its own permission that allows it to assume the role, and the target role's ARPD needs to have a policy that allows that specific identity to assume it.

In certain cloud computing platforms, such as AWS, identities that assume a given role need not reside in the same account as the target role. Assumption by an identity of a role in a "foreign" account is known as cross-account access. Some identities that assume roles are not humans, but rather may be non-human "resources". For example, compute instances such as EC2 and Lambda (both published by Amazon.com, Inc.) also assume roles in order to have the ability to use cloud computing platform APIs.

Roles that permit cross-account access in their ARPD are considered account "entry points". Often, the fact that identities can enter an account and perform actions is an unintended consequence of the way identities are managed across multiple accounts. This is a security risk.

Embodiments described herein are directed to automatically detecting inadvertent, unauthorized account access. For example, a user account may be analyzed to identify roles thereof that permit identities of other accounts to assume the roles of the user account. The analysis is performed for each identified account, including any accounts having roles that permit identities of further accounts to assume the roles of the identified accounts. Accordingly, chain of roles may be determined that indicates how one account may have access to another account via one or intervening role assignments. This circuitous path of account access may be represented and displayed to a user, e.g., via a tree structure. Upon identifying an unauthorized account, an appropriate action may be performed to adjust permissions to prevent the unauthorized access.

The embodiments described herein provide improvements in other technologies, namely data security. By identifying accounts that have unauthorized access to a particular account and removing those accounts' permissions to access the particular account, the other accounts will no longer have access to data of the particular account. Thus, the data (e.g., files, private information, etc.) of that particular account is protected. In addition, unauthorized access to the particular account's the compute resources (e.g., databases, CPUs, storage devices, memory, etc.) is also prevented. Accordingly, the embodiments described herein also improve the functioning of the computing device on which such compute resources are utilized/maintained, as such compute resources are conserved as a result from preventing an entity from utilizing such compute resources, e.g., for nefarious purposes.

For example, FIG. 1 shows a block diagram of an example network-based computing system 100 configured to detect unauthorized account access, according to an example embodiment. As shown in FIG. 1, system 100 includes a plurality of clusters 102A, 102B and 102N communicatively coupled via a network 104. Network 104 may comprise one or more networks such as local area networks (LANs), wide area networks (WANs), enterprise networks, the Internet, etc., and may include one or more of wired and/or wireless portions.

Clusters 102A, 102B and 102N may form a network-accessible server set. Each of clusters 102A, 102B and 102N may comprise a group of one or more nodes and/or a group of one or more storage nodes. For example, as shown in FIG. 1, cluster 102A includes nodes 108A-108N and one or more storage nodes 110, cluster 102B includes nodes 112A-112N, and cluster 102N includes nodes 114A-114N. Each of nodes 108A-108N, 112A-112N and/or 114A-114N are accessible via network 104 (e.g., in a "cloud-based" embodiment, such as a cloud computing network) to build, deploy, and manage applications and services. Each of storage node(s) 110 comprises a plurality of physical storage disks 120 that is accessible via network 104 and is configured to store data associated with the applications and services managed by nodes 108A-108N, 112A-112N, and/or 114A-114N. Examples of physical storage disks 120 include, but are not limited to, hard disk drives, solid state drives, etc.

In an embodiment, one or more of clusters 102A, 102B and 102N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N may be a datacenter in a distributed collection of datacenters.

Each of node(s) 108A-108N, 112A-112N and 114A-114N may be configured to execute one or more software applications (or "applications") and/or services and/or manage hardware resources (e.g., processors, memory, etc.), which may be utilized by users (e.g., customers) of the network-accessible server set. Node(s) 108A-108N, 112A-112N and 114A-114N may also be configured for specific uses. For example, as shown in FIG. 1, node 108A is configured to execute an account analyzer 106, and node 108B is configured to execute an analytics engine 116. It is noted that other nodes of node(s) 108A-108N, 112A-112N and/or nodes 114A-114N may execute an instance of account analyzer 106 and/or analytics engine 116 in addition to or in lieu of nodes 108A and 108B. It is noted that cluster 102B and/or cluster 102N may also include storage node(s) 110. In certain embodiments, each of clusters 102A, 102B, and 102N may represent a group of compute resources (e.g., nodes, storage nodes, etc.) that have been allocated for a customer for implementing a particular one or more applications or services.

Storage disks 120 may be configured to maintain one or more databases that store cloud computing platform accounts (or "accounts") 118. Storage disks 120 may further maintain ARPDs, and/or other types of policies and/or permissions for accounts 118, users, and/or roles.

Account analyzer 106 may be configured to, for any given cloud computing platform account, analyze account entry points, associated ARPDs, and user and/or role policies in other cloud computing platform accounts. The foregoing is performed to find all of the original "leaf-node" identities that can enter these access points and perform actions. According to the embodiments described herein, the identities, roles, and resources in each account are analyzed and the data specifying which identities can assume which roles is persisted. The data may be stored as a relationship in a database maintained by storage node(s) 110. For any given identity, account analyzer 106 stores (e.g., in storage node(s) 110 or a memory local to node 108A) a list of roles the identity can assume. Likewise, for each role, the account analyzer 106 stores (e.g., in storage node(s) 110 or a memory local to node 108A) a list of identities that can assume the role. These lists do not, however, generally contain cross-account identities unless they are explicit, that is, without utilizing a wildcard (a character that represents any other unspecified character or string) and/or "/root" references. Account analyzer 106 performs the cross-account analysis.

For instance, account analyzer 106 may determine the elements of a data structure for a given account. The data structure may take any known form, preferably for ease of presentation and overview on a user interface such that a user is able to easily access and view highest level entries, sub-entries, sub-sub-entries, etc., ultimately to a lowest level. One suitable structure is a tree, which may be represented onscreen in any known manner. In embodiments that represent the hierarchical relationships in the form of a tree, the base of the tree is the account being analyzed, the next-level nodes are the entry-point roles in that account, and all other nodes are cross-account identities who can reach these entry points. Intermediate nodes indicate cross-account roles in known accounts. Leaf nodes are either type of identities in known accounts, plus roles and root users in unknown accounts.

Policy documents may be created by administrators, but they may also be provided by the cloud computing platform itself. Certain policy documents do not explicitly list the resources on which an action can be performed. Most commonly, they are listed with a wildcard character such as "*", meaning all resources. Account analyzer 106 is configured to expand these wildcards by searching for all resources in the same account on which the given action could be performed. Account analyzer 106 may perform this by collecting all of the raw policy documents that are accessible from the cloud computing platform via APIs, storing them, and then processing them as described below.

A wildcard resource, whether a global "*" or something more limited, may refer to resources in other accounts. Account analyzer 106 processes one account at a time, and does not expand wildcards into cross-account resources. Instead, account analyzer 106 is configured to track when a wildcard could be referring to them.

An ARPD can refer to entities in a few different ways, and some of these ways capture entities that are in other accounts. Similar to the resources in policies, account analyzer 106 expands and tags these. For each identity listed, the account analyzer 106 checks that identity's permissions to list only those that are both listed in the ARPD and have listed permissions to assume this role.

When analyzing a particular account (e.g., account A), account analyzer 106 may perform the following steps to construct a tree structure where the root node is the account being analyzed (e.g., account A), the next level contains the entry-point roles, the subsequent, intermediate notes are cross-account roles, and finally, the leaf nodes are cross-account identities that can assume any role discovered along the way. First, account analyzer 106 is configured to find all roles in account A that have an ARPD that permits cross-account identities to assume the roles. Such roles are designated as entry points. Next, for each identified entry point role, the cross-account identities that can assume the role are identified. Such cross-account identities are identified based on the role's ARPD and each identity's own permissions.

For each identified cross-account identity, if the identity is of type role in an account for which the analysis has already been performed by account analyzer 106, then account analyzer 106 designates the identity as a "connecting role" node. If the identity is of type role, but it is associated with an unknown account (an account that has yet to be analyzed), then the identity is designed as a leaf node. If the identity is a root user, then the identity is designed as "root, plus all identities in root's account." If account analyzer 106 has the details of this account, account analyzer 106 recursively analyzes each identity in that account. If account analyzer 106 does not have the details of the root's account, then account analyzer 106 designates this identity as a leaf node.

Simply stated, for each account of accounts 118, account analyzer 106 identifies roles that permit one or more identities of other accounts (e.g., accounts within the same organization of the account and/or accounts outside the organization of the account) to assume the role of the first account. Such identification may be performed by analyzing an ARPD associated with the role and analyzing permissions associated with the identities. For instance, the ARPD may specify a rule indicating the resources (e.g., accounts) that the role is able to access. In one example, the rule may explicitly specify that a role is provided access to a particular account. In another example, the rule may specify a wildcard character that indicates the role has access to all resources.

Account analyzer 106 then analyzes each of the determined other accounts to determine whether such accounts comprise roles that permit an identity of further accounts to assume either the role of the initial account (e.g., account A) and/or any of the determined other accounts. Account analyzer 106 recursively performs the foregoing operations for each account determined. If a determination is made that an account does not specify any roles that permit an identity of any accounts previously analyzed, then account analyzer 106 may determine that such an account is a leaf node. The initial account being analyzed may be designated as a root node, and any accounts, roles, and/or identities identified therebetween may be designated as intermediary or connecting nodes.

Based on the determined nodes, account analyzer 106 may generate a structure (e.g., a tree structure); however, the embodiments described herein are not so limited. Any storage format may be used to enable efficient rendering and transfer to a user interface. In one particular example, a JavaScript Object Notation (JSON) document may be created for each entry-point role, each of which contains two lists: a list of cross-account identities that can ultimately be entered via the entry-point role, and a list of cross-account intermediate "connecting role" nodes, where each of the intermediate nodes contains a list of its child leaf nodes.

Using such data structures, account analyzer 106 may construct a tree (e.g., either upwards from a cross-account role, or downwards from a leaf node) by searching the corresponding lists for the next node in the tree. The tree is rendered via a graphical user interface and may be inspectable by a user or automated provisioning routine that can determine, using the tree, the presence of any over-provisioned scenarios. An appropriate action may be performed to adjust permissions of or delete the various leaf-level entities.

Figure 2:
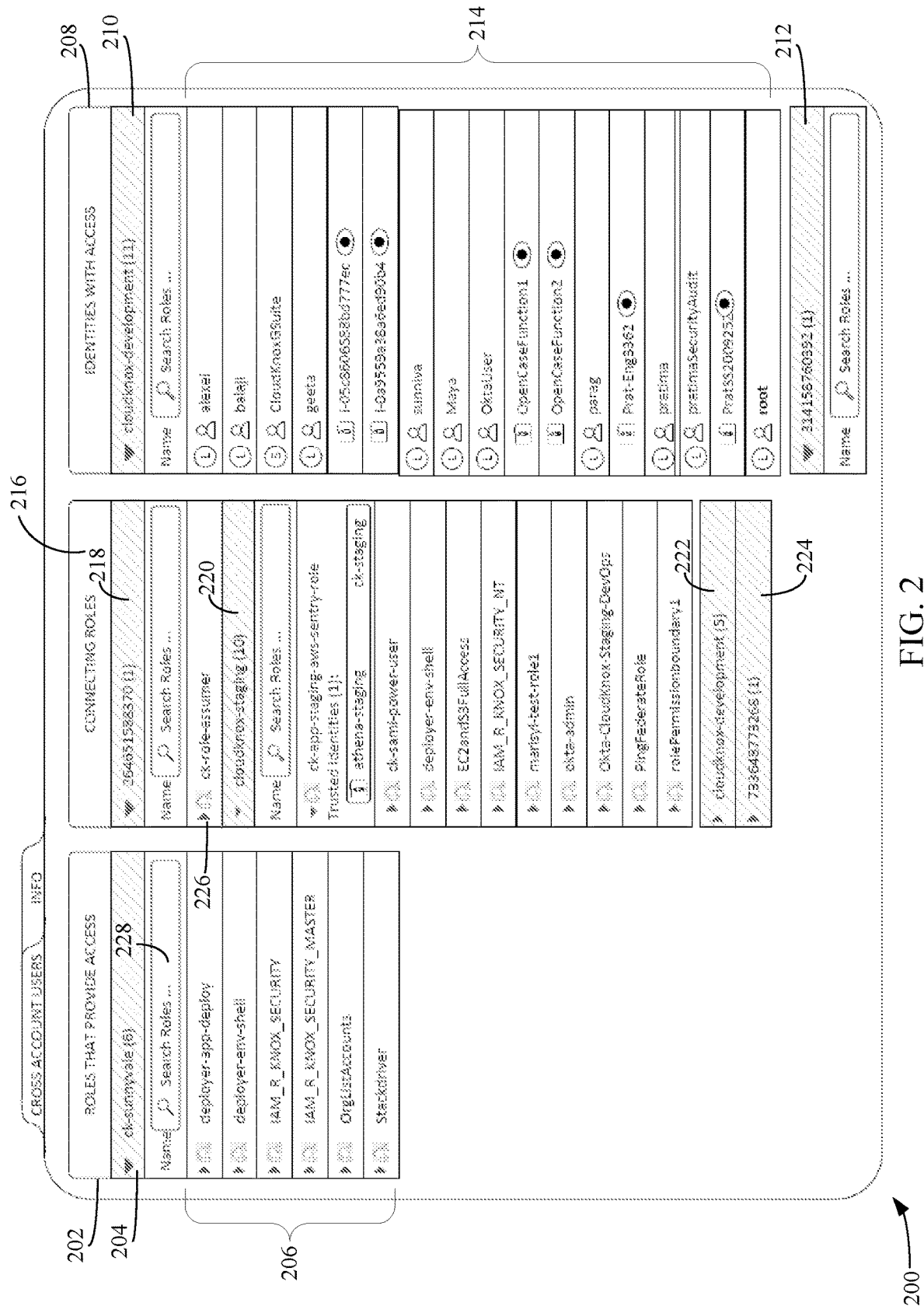
FIG. 2 depicts an example tree structure displayed via a user interface in accordance with an example embodiment.

FIG. 2 depicts an example tree structure displayed via a user interface 200 in accordance with an example embodiment. User interface 200 may be provided by account analyzer 106 of FIG. 1. As shown in FIG. 2, the left most panel 202 specifies an account 204 "ck-sunnyvale") for which the analysis was performed (i.e., the root node) by account analyzer 106. Left most panel 202 also specifies all the roles 206 of account 204 that may provide cross-account access (i.e., roles 206 may be cross-account entry points). The right most panel 208 comprises a list of leaf nodes, each representative of an account (e.g., accounts 210 and 212) and associated identities (e.g., identities 214) thereof that have access to account 204. In the example shown in FIG. 2, identities of accounts 210 and 212 have access to account 204 via connecting roles (or intermediary nodes) displayed via the middle panel 216. In the example shown in FIG. 2, four accounts 218, 220, 222, and 224 comprise roles by which accounts 210 and 212 have access to account 204.

As further shown in FIG. 2, each role displayed therein may be expanded (e.g., via an expanding triangular widget 226) to show all of the leaf nodes that can ultimately assume that role. Other widgets, icons, pull-down menus, or hierarchical display techniques may of course be used instead as long as they enable a sufficient overview. For example, as shown in FIG. 2, per-list search boxes 228 ("Search Roles . . . " and "Search Identities . . . ") may be provided to search for particular roles or identities.

Figure 3:
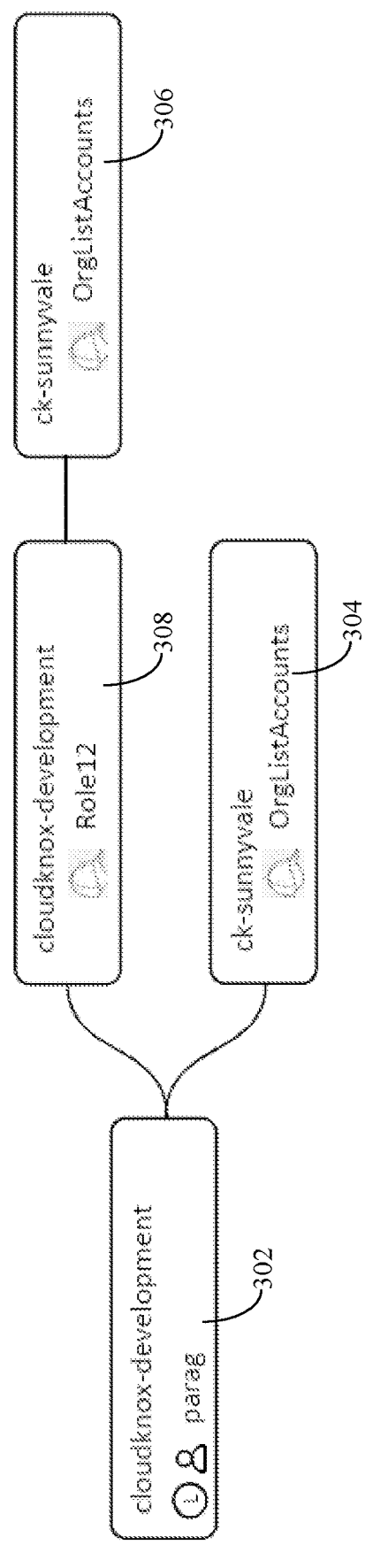
FIG. 3 depicts an example of a graph that may be displayed for any given role or leaf-node identity in accordance with an example embodiment.

FIG. 3 depicts an example of a graph 300 that may be displayed for any given role or leaf-node identity (e.g., displayed via FIG. 2) in accordance with an example embodiment. Graph 300 may be activated and displayed, for example, when an administrator or other user of user interface 200 clicks on or otherwise selects a role or identity of interest. Node 302 (shown on the left side of graph 300) represents the identity that the user clicked on via user interface 200. Each path stemming from node 302 ends at a respective target node (e.g., nodes 304 and 306) that represents the root account that can be accessed by the selected identity. As shown in FIG. 3, the identity "parag" obtained access to account "ck-sunnyvale" via two paths, one directly, and the other indirectly (e.g., via the role "Role 12" of account "cloudknox-development" represented by node 308. If the user selects an entry-point role via user interface 200, target nodes 304 and 306 in each path would be the identities that can assume the selected entry-point role. If a leaf-node is selected via user interface 200, however, then target nodes 304 and 306 are roles in the original account that the identity can enter.

As described above, an appropriate action may be performed to adjust permissions of the various leaf-level entities. For instance, a user may be enabled to, e.g., via user interface 200, to remove permissions from various leaf-level entities. In another example, certain leaf-level entities may be automatically removed. For instance, analytics engine 116 may be configured to analyze each role of the determined tree structure to determine whether such a role is inactive with respect to the target account (e.g., account A). Analytics engine 116 may periodically retrieve logs (e.g., maintained via storage node(s) 110) that specify certain actions that were performed by a particular role. Such actions may include actions pertaining to cloud infrastructure activity (e.g., creating database instances, modifying database instance configurations, etc.). If a log determines that a particular role has not performed any such activity for a predetermined period of time (e.g., 90 days), then analytics engine 116 may determine that the role is inactive. In response, analytics engine 116 may remove the permissions associated with the role and/or remove the role altogether.

Figure 4:
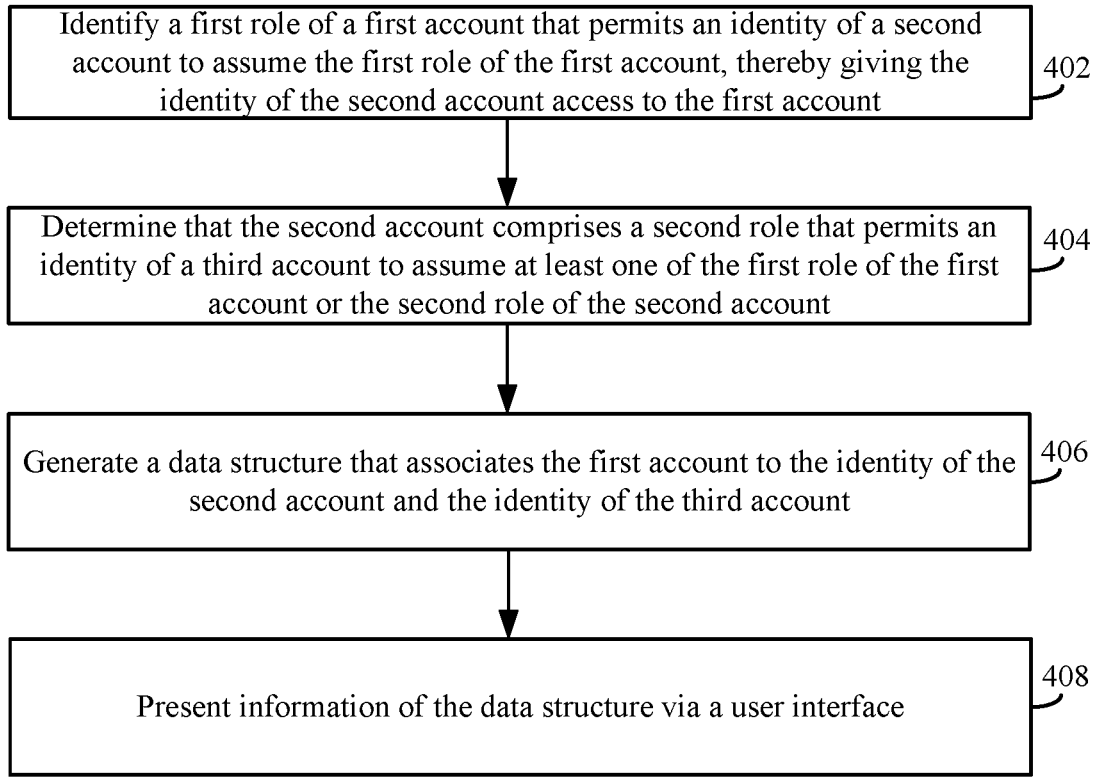
FIG. 4 shows a flowchart of a method for detecting unauthorized account access in accordance with an example embodiment.

Accordingly, unauthorized account access may be detected in many ways. For example, FIG. 4 shows a flowchart 400 of a method for detecting unauthorized account access in accordance with an example embodiment. In an embodiment, flowchart 400 may be implemented by system 100. Accordingly, flowchart 400 will be described with continued reference to FIG. 1. Other structural and operational embodiments will be apparent to persons skilled in the relevant art(s) based on the discussion regarding flowchart 400 and system 100 of FIG. 1.

Flowchart 400 begins with step 402. In step 402, a first role of a first account that permits an identity of a second account to assume the first role of the first account, thereby giving the identity of the second account access to the first account, is identified. For example, with reference to FIG. 1, account analyzer 106 identifies a first role of a first account of accounts 118 that permits an identity of a second account of accounts 118 to assume the first role of the first account, thereby giving the identity of the second account access to the first account.

In accordance with one or more embodiments, the first role is identified by determining that an assume role policy document associated with the first role specifies that the identity of the second account is permitted to assume the first role of the first account, and determining that the identity of the second account is associated with a permission that permits the identity of the second account to assume the first role of the first account. For example, with reference to FIG. 1, account analyzer 106 determines that an assume role policy document (e.g., maintained via storage node(s) 110) associated with the first role specifies that the identity of the second account of accounts 118 is permitted to assume the first role of the first account of accounts 118. Account analyzer 106 also determines that the identity of the second account of accounts 118 is associated with a permission that permits the identity of the second account of accounts 118 to assume the first role of the first account of accounts 118. The permissions may be specified, e.g., by an administrator, and may be stored via a file or other suitable data structure in storage node(s) 110.

In step 404, a determination is made that the second account comprises a second role that permits an identity of a third account to assume at least one of the first role of the first account or the second role of the second account. For example, with reference to FIG. 1, account analyzer 106 determines that the second account of accounts 118 comprises a second role that permits an identity of a third account of accounts 118 to assume at least one of the first role of the first account or the second role of the second account.

In step 406, a data structure that associates the first account to the identity of the second account and the identity of the third account is generated. For example, with reference to FIG. 1, account analyzer 106 generates a data structure that associates the first account to the identity of the second account and the identity of the third account. The data structure may be stored via storage node(s) 110 or via a memory local to node 108A.

In step 408, information of the data structure is presented via a user interface. For example, with reference to FIG. 1, account analyzer 106 may provide a user interface that presents information of the data structure.

In accordance with one or more embodiments, the information of the data structure is presented via a user interface by representing a tree-based structure via a graphical user interface. For example, with reference to FIG. 1, account analyzer 106 is configured to present the information of the data structure via the user interface by representing a tree-based structure via a graphical user interface provided thereby.

In accordance with one or more embodiments, the information may be presented via audio (generated or played back), via a printed report, etc., in addition to or in lieu of, a graphical user interface. The information presented conveys the determined relationship between at least the first account, the identity of the second account, and the identity of the third account.

In accordance with one or more embodiments, the first account, the second account, and the third account are each a user account of a cloud computing platform. For example, with reference to FIG. 1, the first, second, and third accounts of accounts 118 are each a user account of a cloud computing platform.

In accordance with one or more embodiments, the data structure is a tree-based structure comprising a root node, an intermediary node, and a leaf node, wherein the root node represents the first account (e.g., of accounts 118), the intermediary node represents the identity of the second account (e.g., of accounts 118), and the leaf node represents the identity of the third account (e.g., of accounts 118), and wherein the root node is coupled to the intermediary node via a first edge, and the intermediary node is coupled to the leaf node via a second edge.

In accordance with one or more embodiments, a determination is made that the second role is inactive with respect to the first account, and responsive to determining that the second role is inactive with respect to the first account, a permission permitting the identity of the third account access to the first account is removed. For example, with reference to FIG. 1, analytics engine 116 determines that the second role is inactive with respect to the first account of accounts 118 and responsive to determining that the second role is inactive with respect to the first account of accounts 118, analytics engine 116 removes the permission permitting the identity of the third account access to the first account.

In accordance with one or more embodiments, a determination is made that the second role is inactive based on a determination that the second role has not performed at least one of creating a database instance for the first account or modifying a configuration of the database instance. For example, with reference to FIG. 1, analytics engine 116 determines that the second role has not performed at least one of creating a database instance for the first account or modifying a configuration of the database instance.

In accordance with one or more embodiments, operations similar to steps 402 and 404 are recursively performed until no more accounts comprising an identity that can assume a role of the first account (or any other intermediary account) are found. Thus, account analyzer 106 may determine other accounts, in addition to the third account described above, that comprise identities that can assume roles of first, second, or third account. For instance, a determination may be made that the third account comprises a third role that permits an identity of a fourth account to assume at least one the first role of the first account, the second role of the second account, or the third role of the third account, the data structure further associating the first account to the identity of the fourth account. For example, with reference to FIG. 1, account analyzer 106 determines that the third account of accounts 118 comprises a third role that permits an identity of a fourth account of accounts 118 to assume at least one the first role of the first account of accounts 118, the second role of the second account of accounts 118, or the third role of the third account of accounts 118. The data structure generated by account analyzer 106 further associates the first account of accounts 118 to the identity of the fourth account of accounts 118.

Figure 5:
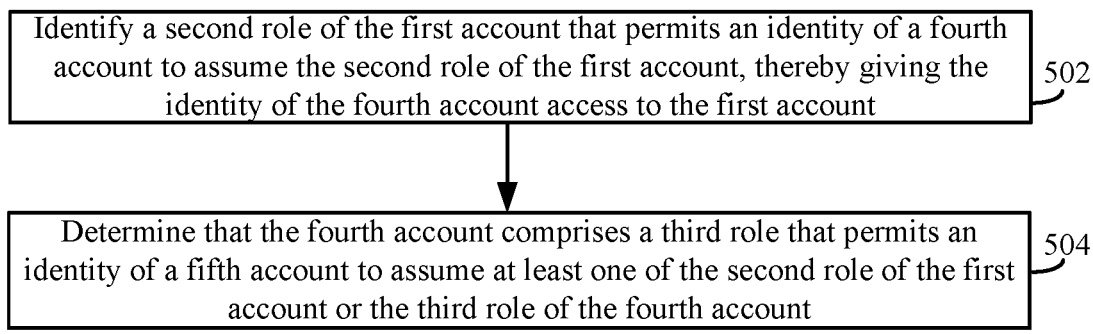
FIG. 5 shows a flowchart of a method for detecting additional unauthorized account access in accordance with another example embodiment.

In accordance with one or more embodiments, similar steps of flowchart 400 may be performed with respect to each role of the first account that permits an identity of another account to assume such a role of the first account. For example, FIG. 5 shows a flowchart 500 of a method for detecting additional unauthorized account access in accordance with an example embodiment. In an embodiment, flowchart 500 may be implemented by system 100. Accordingly, flowchart 500 will be described with continued reference to FIG. 1. Other structural and operational embodiments will be apparent to persons skilled in the relevant art(s) based on the discussion regarding flowchart 500 and system 100 of FIG. 1.

Flowchart 500 begins with step 502. In step 502, a second role of the first account that permits an identity of a fourth account to assume the second role of the first account, thereby giving the identity of the fourth account access to the first account, is identified. For example, with reference to FIG. 1, account analyzer 106 identifies a second role of the first account of accounts 118 that permits an identity of a fourth account of accounts 118 to assume the second role of the first account of accounts 118, thereby giving the identity of the fourth account access to the first account.

In step 504, a determination is made that the fourth account comprises a third role that permits an identity of a fifth account to assume at least one of the second role of the first account or the third role of the fourth account, the data structure further associating the first account to the identity of the fourth account and the identity of the fifth account. For example, with reference to FIG. 1, account analyzer 106 determines that the fourth account of accounts 118 comprises a third role that permits an identity of a fifth account of accounts 118 to assume at least one of the second role of the first account or the third role of the fourth account. The data structure generated by account analyzer 106 further associates the first account of accounts 118 to the identity of the fourth account of accounts 118 and the identity of the fifth account of accounts 118.

III. Example Computer System Implementation

The systems and methods described above in reference to FIGS. 1-5, may be implemented in hardware, or hardware combined with one or both of software and/or firmware. For example, system 600 of FIG. 6 may be used to implement any of nodes 108A-108B, 112A-112N, and/or 114A-114N, storage node(s) 110, and account analyzer 106, and/or analytics engine 116 of FIG. 1, UI 200 of FIG. 2, graph 300 of FIG. 3, and/or any of the components respectively described therein, and flowcharts 400 and/or 500 may be each implemented as computer program code/instructions configured to be executed in one or more processors and stored in a computer readable storage medium. Alternatively, any of nodes 108A-108B, 112A-112N, and/or 114A-114N, storage node(s) 110, and account analyzer 106, and/or analytics engine 116 of FIG. 1, UI 200 of FIG. 2, graph 300 of FIG. 3, and/or any of the components respectively described therein, and flowcharts 400 and/or 500 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. The description of system 600 provided herein is provided for purposes of illustration, and is not intended to be limiting. Embodiments may be implemented in further types of computer systems, as would be known to persons skilled in the relevant art(s).

Figure 6:
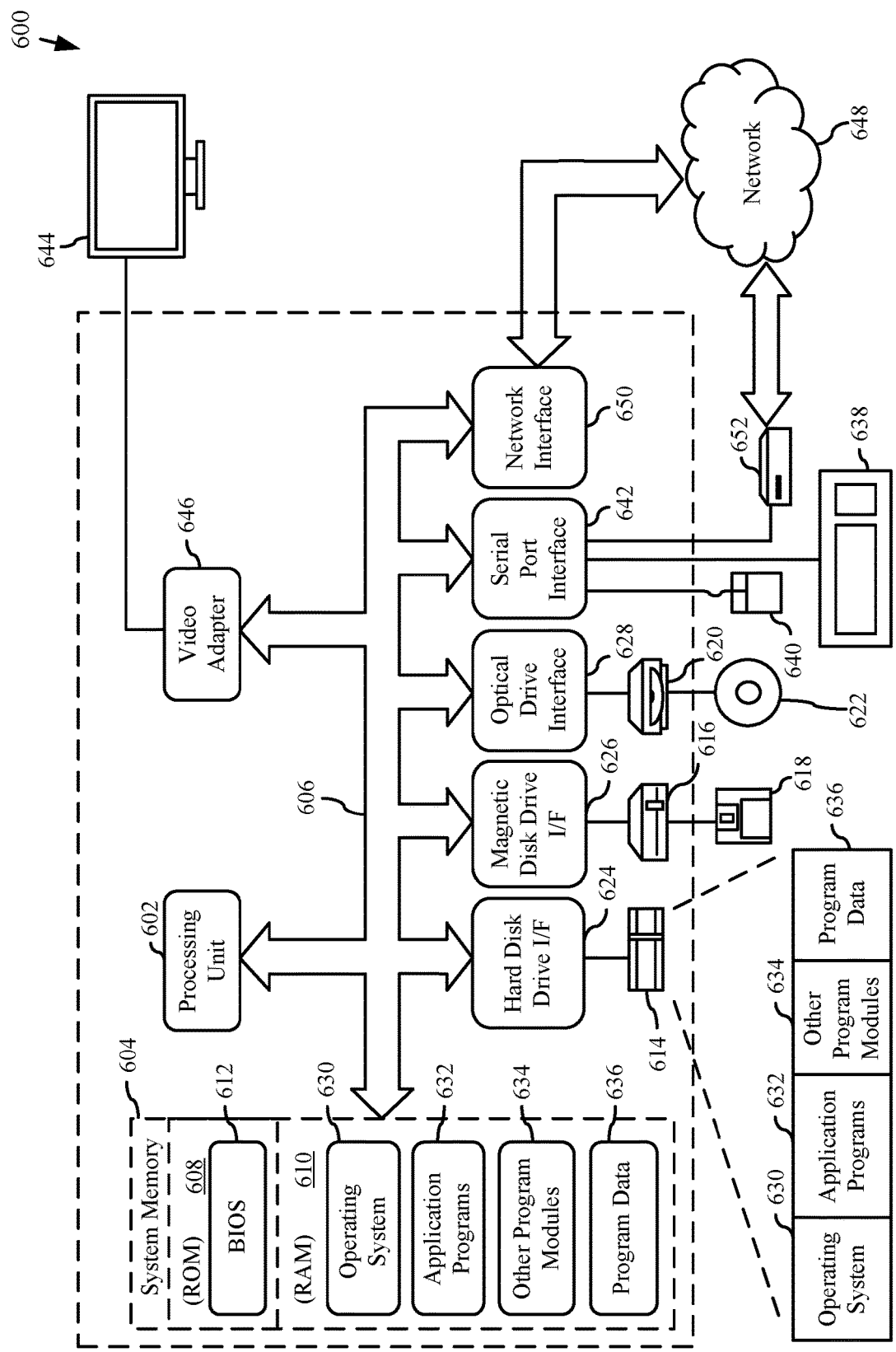
FIG. 6 is a block diagram of an example processor-based computer system that may be used to implement various embodiments.

As shown in FIG. 6, system 600 includes a processing unit 602, a system memory 604, and a bus 606 that couples various system components including system memory 604 to processing unit 602. Processing unit 602 may comprise one or more circuits, microprocessors or microprocessor cores. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

System 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, BLU-RAY™ disk or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives, flash memory cards, digital video disks, random access memories (RAMs), read only memories (ROM), and the like.

A number of program modules may be stored on the hard disk, magnetic disk, optical disk, ROM, or RAM. These program modules include an operating system 630, one or more application programs 632, other program modules 634, and program data 636. In accordance with various embodiments, the program modules may include computer program logic that is executable by processing unit 602 to perform any or all of the functions and features of any of nodes 108A-108B, 112A-112N, and/or 114A-114N, storage node(s) 110, and account analyzer 106, and/or analytics engine 116 of FIG. 1, UI 200 of FIG. 2, graph 300 of FIG. 3, and/or any of the components respectively described therein, as described above. The program modules may also include computer program logic that, when executed by processing unit 1102, causes processing unit 1102 to perform any of the steps of any of the flowcharts of FIGS. 4 and 5, as described above.

A user may enter commands and information into system 600 through input devices such as a keyboard 638 and a pointing device 640 (e.g., a mouse). Other input devices (not shown) may include a microphone, joystick, game controller, scanner, or the like. In one embodiment, a touch screen is provided in conjunction with a display 644 to allow a user to provide user input via the application of a touch (as by a finger or stylus for example) to one or more points on the touch screen. These and other input devices are often connected to processing unit 602 through a serial port interface 642 that is coupled to bus 606, but may be connected by other interfaces, such as a parallel port, game port, or a universal serial bus (USB). Such interfaces may be wired or wireless interfaces.

Display 644 is connected to bus 606 via an interface, such as a video adapter 646. In addition to display 644, system 600 may include other peripheral output devices (not shown) such as speakers and printers.

System 600 is connected to a network 648 (e.g., a local area network or wide area network such as the Internet) through a network interface 650, a modem 652, or other suitable means for establishing communications over the network. Modem 652, which may be internal or external, is connected to bus 606 via serial port interface 642.

As used herein, the terms "computer program medium," "computer-readable medium," and "computer-readable storage medium" are used to generally refer to memory devices or storage structures such as the hard disk associated with hard disk drive 614, removable magnetic disk 618, removable optical disk 622, as well as other memory devices or storage structures such as flash memory cards, digital video disks, random access memories (RAMs), read only memories (ROM), and the like. Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650, serial port interface 642, or any other interface type. Such computer programs, when executed or loaded by an application, enable system 600 to implement features of embodiments discussed herein. Accordingly, such computer programs represent controllers of the system 600.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, solid state drives, floppy disks, CD ROMs, DVD ROMs, zip disks, tapes, magnetic storage devices, optical storage devices, MEMs, nanotechnology-based storage devices, and the like.

IV. Further Example Embodiments

A method performed by one or more computing devices is described herein. The method includes: identifying a first role of a first account that permits an identity of a second account to assume the first role of the first account, thereby giving the identity of the second account access to the first account; determining that the second account comprises a second role that permits an identity of a third account to assume at least one of the first role of the first account or the second role of the second account; generating a data structure that associates the first account to the identity of the second account and the identity of the third account; and presenting information of the data structure via a user interface.

In one implementation of the foregoing method, the data structure is a tree-based structure comprising a root node, an intermediary node, and a leaf node, wherein the root node represents the first account, the intermediary node represents the identity of the second account, and the leaf node represents the identity of the third account, and wherein the root node is coupled to the intermediary node via a first edge, and the intermediary node is coupled to the leaf node via a second edge.

In another implementation of the foregoing method, the method further comprises: identifying a second role of the first account that permits an identity of a fourth account to assume the second role of the first account, thereby giving the identity of the fourth account access to the first account; and determining that the fourth account comprises a third role that permits an identity of a fifth account to assume at least one of the second role of the first account or the third role of the fourth account, the data structure further associates the first account to the identity of the fourth account and the identity of the fifth account.

In another implementation of the foregoing method, the method further comprises: determining that the third account comprises a third role that permits an identity of a fourth account to assume at least one the first role of the first account, the second role of the second account, or the third role of the third account, the data structure further associates the first account to the identity of the fourth account.

In another implementation of the foregoing method, said identifying comprises: determining that an assume role policy document associated with the first role specifies that the identity of the second account is permitted to assume the first role of the first account; and determining that the identity of the second account is associated with a permission that permits the identity of the second account to assume the first role of the first account.

In another implementation of the foregoing method, the method further comprises: determining that the second role is inactive with respect to the first account; and responsive to determining that the second role is inactive with respect to the first account, a permission granting the second role access to the first account is removed.

In another implementation of the foregoing method, said determining comprises: determining that the second role has not performed at least one of: creating a database instance for the first account; or modifying a configuration of the database instance.

In another implementation of the foregoing method, the first account, the second account, and the third account are each a user account of a cloud computing platform.

A system is also described herein. The system includes: at least one processor circuit; and at least one memory that stores program code configured to be executed by the at least one processor circuit, the program code comprising: an account analyzer configured to: identify a first role of a first account that permits an identity of a second account to assume the first role of the first account, thereby giving the identity of the second account access to the first account; determine that the second account comprises a second role that permits an identity of a third account to assume at least one of the first role of the first account or the second role of the second account; generate a data structure that associates the first account to the identity of the second account and the identity of the third account; and present information of the data structure via a user interface.

In one implementation of the foregoing system, the data structure is a tree-based structure comprising a root node, an intermediary node, and a leaf node, wherein the root node represents the first account, the intermediary node represents the identity of the second account, and the leaf node represents the identity of the third account, and wherein the root node is coupled to the intermediary node via a first edge, and the intermediary node is coupled to the leaf node via a second edge.

In another implementation of the foregoing system, the account analyzer is further configured to: identify a second role of the first account that permits an identity of a fourth account to assume the second role of the first account, thereby giving the identity of the fourth account access to the first account; and determine that the fourth account comprises a third role that permits an identity of a fifth account to assume at least one of the second role of the first account or the third role of the fourth account, the data structure further associates the first account to the identity of the fourth account and the identity of the fifth account.

In another implementation of the foregoing system, the account analyzer is further configured to: determine that the third account comprises a third role that permits an identity of a fourth account to assume at least one the first role of the first account, the second role of the second account, or the third role of the third account, the data structure further associates the first account to the identity of the fourth account.

In another implementation of the foregoing system the account analyzer is configured to identify the first role of the first account that permits the identity of the second account to assume the first role of the first account by: determining that an assume role policy document associated with the first role specifies that the identity of the second account is permitted to assume the first role of the first account; and determining that the identity of the second account is associated with a permission that permits the identity of the second account to assume the first role of the first account.

In another implementation of the foregoing system, the program code further comprises an analytics engine configured to: determine that the second role is inactive with respect to the first account; and responsive to determining that the second role is inactive with respect to the first account, a permission granting the second role access to the first account is removed.

In another implementation of the foregoing system, the analytics engine is further configured to determine that the second role is inactive with respect to the first account by: determining that the second role has not performed at least one of: creating a database instance for the first account; or modifying a configuration of the database instance.

In another implementation of the foregoing system, the first account, the second account, and the third account are each a user account of a cloud computing platform.

A computer-readable storage medium having program instructions recorded thereon that, when executed by at least one processor, perform a method. The method includes: identifying a first role of a first account that permits an identity of a second account to assume the first role of the first account, thereby giving the identity of the second account access to the first account; determining that the second account comprises a second role that permits an identity of a third account to assume at least one of the first role of the first account or the second role of the second account; generating a data structure that associates the first account to the identity of the second account and the identity of the third account; and presenting information of the data structure via a user interface.

In another implementation of the foregoing computer-readable storage medium, the data structure is a tree-based structure comprising a root node, an intermediary node, and a leaf node, wherein the root node represents the first account, the intermediary node represents the identity of the second account, and the leaf node represents the identity of the third account, and wherein the root node is coupled to the intermediary node via a first edge, and the intermediary node is coupled to the leaf node via a second edge.

In another implementation of the foregoing computer-readable storage medium, the method further comprises: identifying a second role of the first account that permits an identity of a fourth account to assume the second role of the first account, thereby giving the identity of the fourth account access to the first account; and determining that the fourth account comprises a third role that permits an identity of a fifth account to assume at least one of the second role of the first account or the third role of the fourth account, the data structure further associates the first account to the identity of the fourth account and the identity of the fifth account.

In another implementation of the foregoing computer-readable storage medium, the method further comprises: determining that the third account comprises a third role that permits an identity of a fourth account to assume at least one the first role of the first account, the second role of the second account, or the third role of the third account, the data structure further associates the first account to the identity of the fourth account.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A system, comprising:
   at least one processor circuit; and
   at least one memory that stores program code configured to be executed by the at least one processor circuit, the program code comprising:
      an account analyzer configured to:
         identify a first role of a first account that permits an identity of a second account to assume the first role of the first account, thereby giving the identity of the second account access to the first account;
         determine that the second account comprises a second role that permits an identity of a third account to assume at least one of the first role of the first account or the second role of the second account;
         generate a data structure that associates the first account to the identity of the second account and the identity of the third account; and
         present information of the data structure via a user interface.

2. The system of claim 1, wherein the data structure is a tree-based structure comprising a root node, an intermediary node, and a leaf node, wherein the root node represents the first account, the intermediary node represents the identity of the second account, and the leaf node represents the identity of the third account, and wherein the root node is coupled to the intermediary node via a first edge, and the intermediary node is coupled to the leaf node via a second edge.

3. The system of claim 1, wherein the account analyzer is further configured to:
   identify a second role of the first account that permits an identity of a fourth account to assume the second role of the first account, thereby giving the identity of the fourth account access to the first account; and
   determine that the fourth account comprises a third role that permits an identity of a fifth account to assume at least one of the second role of the first account or the third role of the fourth account,
   wherein the data structure further associates the first account to the identity of the fourth account and the identity of the fifth account.

4. The system of claim 1, wherein the account analyzer is further configured to:
- determine that the third account comprises a third role that permits an identity of a fourth account to assume at least one the first role of the first account, the second role of the second account, or the third role of the third account,
- wherein the data structure further associates the first account to the identity of the fourth account.

5. The system of claim 1, wherein the account analyzer is configured to identify the first role of the first account that permits the identity of the second account to assume the first role of the first account by:
- determining that an assume role policy document associated with the first role specifies that the identity of the second account is permitted to assume the first role of the first account; and
- determining that the identity of the second account is associated with a permission that permits the identity of the second account to assume the first role of the first account.

6. The system of claim 1, wherein the program code further comprises an analytics engine configured to:
- determine that the second role is inactive with respect to the first account; and
- responsive to determining that the second role is inactive with respect to the first account, remove a permission permitting the identity of the third account access to the first account.

7. The system of claim 6, wherein the analytics engine is configured to determine that the second role is inactive with respect to the first account by:
- determining that the second role has not performed at least one of:
  - creating a database instance for the first account; or
  - modifying a configuration of the database instance.

8. The system of claim 1, wherein the first account, the second account, and the third account are each a user account of a cloud computing platform.

9. A method performed by one or more computing devices, comprising:
- identifying a first role of a first account that permits an identity of a second account to assume the first role of the first account, thereby giving the identity of the second account access to the first account;
- determining that the second account comprises a second role that permits an identity of a third account to assume at least one of the first role of the first account or the second role of the second account;
- generating a data structure that associates the first account to the identity of the second account and the identity of the third account; and
- presenting information of the data structure via a user interface.

10. The method of claim 9, wherein the data structure is a tree-based structure comprising a root node, an intermediary node, and a leaf node, wherein the root node represents the first account, the intermediary node represents the identity of the second account, and the leaf node represents the identity of the third account, and wherein the root node is coupled to the intermediary node via a first edge, and the intermediary node is coupled to the leaf node via a second edge.

11. The method of claim 9, further comprising:
- identifying a second role of the first account that permits an identity of a fourth account to assume the second role of the first account, thereby giving the identity of the fourth account access to the first account; and
- determining that the fourth account comprises a third role that permits an identity of a fifth account to assume at least one of the second role of the first account or the third role of the fourth account,
- wherein the data structure further associates the first account to the identity of the fourth account and the identity of the fifth account.

12. The method of claim 9, further comprising:
- determining that the third account comprises a third role that permits an identity of a fourth account to assume at least one the first role of the first account, the second role of the second account, or the third role of the third account,
- wherein the data structure further associates the first account to the identity of the fourth account.

13. The method of claim 9, wherein said identifying comprises:
- determining that an assume role policy document associated with the first role specifies that the identity of the second account is permitted to assume the first role of the first account; and
- determining that the identity of the second account is associated with a permission that permits the identity of the second account to assume the first role of the first account.

14. The method of claim 9, further comprising:
- determining that the second role is inactive with respect to the first account; and
- responsive to determining that the second role is inactive with respect to the first account, removing a permission permitting the identity of the third account access to the first account.

15. The method of claim 14, wherein said determining comprises:
- determining that the second role has not performed at least one of:
  - creating a database instance for the first account; or
  - modifying a configuration of the database instance.

16. The method of claim 9, wherein the first account, the second account, and the third account are each a user account of a cloud computing platform.

17. A computer-readable storage medium having program instructions recorded thereon that, when executed by at least one processor, perform a method, the method comprising:
- identifying a first role of a first account that permits an identity of a second account to assume the first role of the first account, thereby giving the identity of the second account access to the first account;
- determining that the second account comprises a second role that permits an identity of a third account to assume at least one of the first role of the first account or the second role of the second account;
- generating a data structure that associates the first account to the identity of the second account and the identity of the third account; and
- presenting information of the data structure via a user interface.

18. The computer-readable storage medium of claim 17, wherein the data structure is a tree-based structure comprising a root node, an intermediary node, and a leaf node, wherein the root node represents the first account, the intermediary node represents the identity of the second account, and the leaf node represents the identity of the third account, and wherein the root node is coupled to the intermediary node via a first edge, and the intermediary node is coupled to the leaf node via a second edge.

19. The computer-readable storage medium of claim 17, the method further comprising:
    identifying a second role of the first account that permits an identity of a fourth account to assume the second role of the first account, thereby giving the identity of the fourth account access to the first account; and
    determining that the fourth account comprises a third role that permits an identity of a fifth account to assume at least one of the second role of the first account or the third role of the fourth account,
    wherein the data structure further associates the first account to the identity of the fourth account and the identity of the fifth account.

20. The computer-readable storage medium of claim 17, the method further comprising:
    determining that the third account comprises a third role that permits an identity of a fourth account to assume at least one the first role of the first account, the second role of the second account, or the third role of the third account,
    wherein the data structure further associates the first account to the identity of the fourth account.

* * * * *